United States Patent Office 3,259,619
Patented July 5, 1966

3,259,619
PROCESS FOR THE PREPARATION OF α-BENZ-IMIDAZOLYL - β - BENZOXAZOLYLETHYLENE DERIVATIVES
Adolf Emil Siegrist, Basel, Peter Liechti, Binningen, and Erwin Maeder, Muenchenstein, Switzerland, assignors to Ciba Limited, Basel, Switzerland, a company of Switzerland
No Drawing. Filed Dec. 18, 1962, Ser. No. 245,432
Claims priority, application Switzerland, Jan. 9, 1962, 187/62
2 Claims. (Cl. 260—240)

The present invention provides a new process for the manufacture of α-benzibidazoyly-β-benzoxazolylethylene compounds of the formula (1)
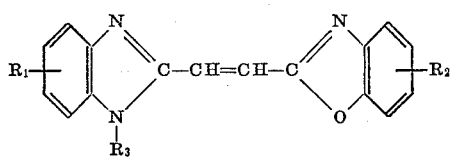

in which $R_1$ and $R_2$ each represents a hydrogen or halogen atom or a substituent such as an alkyl radical, and $R_3$ represents a hydrogen atom or an alkyl, aralkyl, hydroxyalkyl or alkenyl group.

According to the present process a 3-[benzimidazolyl-(2)]-3-hydroxypropionic acid of the formula (2)
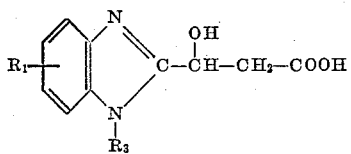

is reacted with an ortho-aminohydroxybenzene of the formula (3)
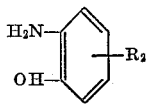

in which $R_1$, $R_2$ and $R_3$ have the meanings defined above.

The carboxylic acids of the Formula 2 used as starting material are advantageously prepared in known manner by reacting equimolecular proportions of an ortho-diaminobenzene of the formula (4)
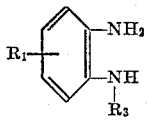

where $R_1$ and $R_3$ have the above meanings—with malic acid in a dilute mineral acid, for example, in dilute hydrochloric acid. The reaction is advantageously performed at an elevated temperature, for example at the boil under reflux.

The ortho-diaminobenzenes of the Formula 4 and the ortho-aminohydroxybenzenes of the Formula 3 are either free from nuclear substituents or they contain, for example, an alkyl group such as isopropyl, ethyl or preferably methyl, or a halogen, such as a chlorine, atom. $R_3$ in the Formula 4 represents primarily a hydrogen atom, or an alkyl radical such as ethyl or methyl, an aralkyl group such as benzyl, a hydroxyalkyl group such as β-hydroxyethyl, or an alkenyl group such as allyl.

According to one variant of the present process the carboxylic acid of the Formula 2 is reacted with the ortho-aminohydroxybenzene of the Formula 3 in the presence of a phosphoric acid of the formula $H_{n+2}P_nO_{3n+1}$ where $n$ is a whole number. Accordingly, the water-eliminating agent used in this variant of the present process is, for example, orthophosphoric acid ($n=1$), pyrophosphoric acid ($n=2$) or a polyphosphoric acid ($n>2$). The phosphoric acids may also constitute mixtures in which $n$ is an average value which need not be a whole number. The reaction is advantageously performed with an excess of phosphoric acid, e.g., five to twenty times the amount of orthphosphoric, pyrophosphoric or polyphosphoric acid referred to the amount of the reactants of the Formulae 2 and 3. The reaction is performed with heating, for example at a temperature ranging from 130 to 200° C., advantageously at about 160° C. Further additives, such as catalysts or diluents, are not required, but it is of advantage to perform the reaction with exclusion of air, for example, under nitrogen or under reduced pressure.

The reaction mixture is very simple to process: All that is needed is to dilute the batch with water on completion of the reaction, an alkali metal hydroxide is then added to establish an alkaline reaction and the precipitated product is isolated from the aqueous suspension. In general, the product of the present reaction is obtained in a satisfactory to good yield and directly of a relatively high degree of purity.

According to another variant of the present process the carboxylic acid of the Formula 2 is reacted with the ortho-aminohydroxy benzene of the Formula 3 in the presence of boric acid, advantageously used in an amount of about 0.5 to 5%, referred to the total weight of the batch. In this variant of the process it is of advantage to perform the reaction in an inert high-boiling organic solvent, such as ethylbenzene, cumene or a xylene, furthermore with exclusion of air and at an elevated temperature for example at the boiling temperature of the solvent chosen.

The substituent $R_3$ at the nitrogen atom may alternatively be introduced subsequently by treating a compound of the Formula 1, not substituted at this nitrogen atom, with an alkylating, aralkylating, hydroxyalkylating or alkenylating agent. The compounds of the Formula 1 may also be sulfonated or, when $R_3$ represents a substituent, transformed into quaternary ammonium compounds.

The compounds of the Formula 1 obtained by the present process are all asymmetric with respect to the heterocycles, and they may also be asymmetric with respect to the substituents of the benzene rings condensed with these heterocycles. The present process enables these asymmetric compounds to be manufactured easily and uniformly in good purity and yields. Compared with the symmetric bisimidazoyl-ethylene and bisoxazolyl-ethylene compounds the imidazolyl-oxazolyl-ethylene compounds offer the advantage that they can be used as optical brighteners for a wide variety of materials.

Unless otherwise indicated, parts and percentages in the following examples are by weight.

*Example 1*

A mixture of 41.2 parts of 3-[benzimidazolyl-(2′)]-3-hydroxypropionic acid, 22.0 parts of 1-amino-2-hydroxybenzene and 400 parts of pyrophosphoric acid is stirred with exclusion of air and heated within 1 hour to 160° C. The resulting green, clear reaction solution is heated for another 7 hours at 160 to 165° C., then cooled to about 100° C. and stirred into 100 parts of cold water. The pH value is adjusted to 8.0 by dropping in aqueous sodium hydroxide solution, the reaction product is suctioned off without previous cooling, thoroughly rinsed with water and dried, to yield about 30.6 parts (=58.6% of the theoretical yield) of α-[benzimidazolyl-(2)]-β-[benzoxazolyl-(2')]-ethylene of the formula (5)
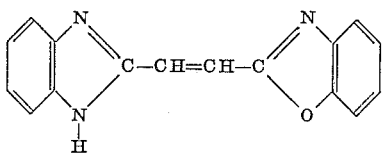

in the form of a yellow powder which melts at 277.5 to 279.5° C. After three recrystallizations from ethanol+water (1:1) with the aid of active carbon, there are obtained very pure, light-yellow needles melting at 277.5 to 279° C.

*Analysis.*—$C_{16}H_{11}ON$ molecular weight, 261.27; calculated: C, 73.55; H, 4.24; N, 16.08%. Found: C, 73.53; H, 4.31; N, 16.27%.

The 3-[benzimidazolyl-(2')]-3-hydroxypropionic acid required as starting material may be prepared by dissolving a mixture of 26.8 parts of malic acid and 21.6 parts of 1:2-diaminobenzene in 125 parts by volume of 4 N-hydrochloric acid, refluxing the solution for 8 hours and then keeping it overnight. The whole is then filtered and an alkali metal hydroxide is added to the filtrate to establish a pH value of 5. The precipitated 3-[benzimidazolyl-(2')]-3-hydroxypropionic acid is filtered off and dried.

When in the above process the 22.0 parts of 1-amino-2-hydroxybenzene are replaced by 26 parts of 1-amino-2-hydroxy-5-methylbenzene, there are obtained about 42.0 parts (=76.3% of the theoretical yield) of α-[benzimidazolyl-(2)]-β-[5'-methylbenzoxazolyl - (2')] - ethylene of the formula (6)
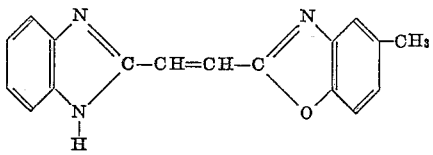

in the form of a yellow powder melting at 266 to 268° C. After three recrystallizations from methanol with the aid of active carbon, there are obtained small, light-yellow, felted needles melting at 268 to 268.5° C.

*Analysis.*—$C_{17}H_{13}ON_3$ molecular weight, 275.30; calculated: C, 74.16; H, 4.76; N, 15.26%. Found: C, 73.79; H, 4.84; N, 15.24%.

Example 2

A mixture of 20.6 parts of 3-[benzimidazolyl-(2')]-3-hydroxypropionic acid, 11.0 parts of 1-amino-2-hydroxybenzene, 1 part of boric acid and 250 parts by volume of xylene is stirred with exclusion of air and heated within one hour to reflux. The reaction mixture is then stirred and refluxed for 24 hours, the water of reaction formed being continuously distilled off. The xylene is then expelled with steam. The batch is cooled to room temperature, rinsed with water and dried, to yield about 23.9 parts (=91.6% of the theoretical yield) of α-[benzimidazolyl-(2)]-β-[benzoxazolyl-(2')]-ethylene of the Formula 5 in the form of a yellowish powder melting at 260 to 271° C. After five recrystallizations from ethanol+water (1:1) with the aid of active carbon, a finely crystalline, light-yellow powder melting at 278 to 279° C. is obtained.

*Analysis.*—$C_{16}H_{11}ON_3$ molecular weight, 261.27; calculated: C, 73.55; H, 4.24; N, 16.08%. Found: C, 73.32; H, 4.29; N, 16.11%.

An analogous reaction yields α-[benzimidazolyl-(2)]-β-[5'-methyl-benzoxazolyl-(2')]-ethylene of the Formula 6 which, after five recrystallizations from methanol with the aid of active carbon, forms a finely crystalline, light-yellow powder melting at 267 to 267.5° C.

Example 3

A solution of 4.0 parts of sodium hydroxide in 90 parts of ethanol and 10 parts of water is heated to 70 to 75° C. and then 13.05 parts of α-[benzimidazolyl-(2)]-β-[benz-oxazolyl-(2')]-ethylene of the Formula 5 are stirred in. In the course of 2 hours, with exclusion of air, a solution of 6.0 parts of ethylene chlorohydrin in 10 parts of ethanol is added dropwise at 70 to 75° C. to the resulting solution and the reaction mixture is stirred for 1 hour at this temperature, then cooled to room temperature, 1000 parts of water are added; the reaction product is mixed, washed with cold water until the washings run neutral and dried. Yield: about 12.6 parts (=82.6% of the theoretical yield) of α-[N-hydroxyethyl-benzimidazolyl-(2)]-β-[benzoxazolyl-(2')]-ethylene of the formula (7)
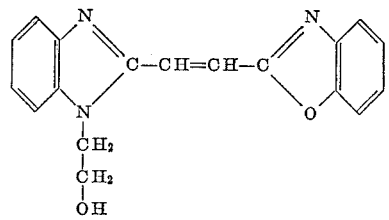

in the form of a yellow powder. After five recrystallizations from methanol with the aid of active carbon, the product forms small, light-yellow felted needles melting at 227.8 to 228.5° C.

*Analysis.*—$C_{18}H_{15}O_2N_3$ molecular weight, 305.32; calculated C, 70.80; H, 4.95; O, 10.48%. Found: C, 70.68; H, 5.25; O, 10.58%.

Example 5

Undyed textile material from cellulose and polyamide fibers is washed at a goods-to-liquor ratio of 1:20 for 10 minutes at 55° C. in a bath containing, per liter, 2 g. of a synthetic detergent and 0.005 g. of an α-benzimidazolyl-β-benzoxazolyl-ethylene compound prepared as described in Examples 1 to 4. After having been rinsed and dried, the textile material treated in this manner displays a substantial optical brightening effect of good fastness to acids.

What is claimed is:

1. Process for the manufacture of asymmetric bis-azolyl-ethylene compounds of the formula

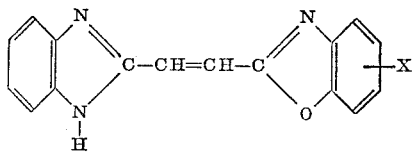

wherein X is selected from hydrogen and lower alkyl, which comprises reacting one molecular proportion of 3-[benzimidazyl-(2')]-3-hydroxypropionic acid at a temperature ranging from 130 to 200° C. and in the presence of a two to twenty times excess of an oxygen containing phosphoric acid with one molecular proportion of an ortho-aminohydroxybenzene of the formula

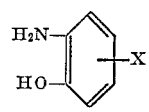

wherein X is selected from hydrogen and lower alkyl.

2. Process for the manufacture of asymmetric bis-azolyl-ethylene compounds of the formula

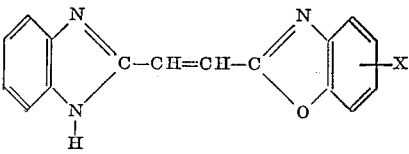

wherein X is selected from hydrogen and lower alkyl, which comprises reacting one molecular proportion of 3-[benzimidazyl-(2′)]-3-hydroxypropionic acid at a temperature ranging from 130 to 200° C. and in the presence of 0.5 to 5% by weight referred to the total weight of the batch, of boric acid with one molecular proportion of an ortho-aminohydroxy-benzene of the formula

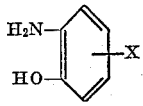

wherein X is selected from hydrogen and lower alkyl.

References Cited by the Examiner

UNITED STATES PATENTS 3,118,883 1/1964 Duennenberger et al. __ 260—240

FOREIGN PATENTS 835,898 5/1960 Great Britain.
861,431 2/1961 Great Britain.
861,472 2/1961 Great Britain.

WALTER A. MODANCE, *Primary Examiner.*

JOHN D. RANDOLPH, *Assistant Examiner.*